(12) United States Patent
Johnson et al.

(10) Patent No.: US 7,156,386 B1
(45) Date of Patent: Jan. 2, 2007

(54) MODULAR CUTTING BOARD SYSTEM

(75) Inventors: Tony A. Johnson, 1960 90th Ave., Dresser, WI (US) 54009; Wayne R. Johnson, Osceola, WI (US)

(73) Assignee: Tony A. Johnson, Dresser, WI (US)

( * ) Notice: Subject to any disclaimer, the term of this patent is extended or adjusted under 35 U.S.C. 154(b) by 0 days.

(21) Appl. No.: 11/232,389

(22) Filed: Sep. 21, 2005

(51) Int. Cl.
*B23Q 3/00* (2006.01)

(52) U.S. Cl. .................. 269/302.1; 269/289 R (58) Field of Classification Search ............ 269/302.1, 269/289 R, 15–16
See application file for complete search history.

(56) References Cited

U.S. PATENT DOCUMENTS

| | | |
|---|---|---|
| 1,745,805 A | 2/1930 | Miller |
| 2,778,324 A | 1/1957 | Mattson |
| 4,017,063 A | 4/1977 | Brusich |
| 4,497,477 A | 2/1985 | Abel |
| 4,653,737 A | 3/1987 | Haskins et al. |
| 4,756,519 A | 7/1988 | Lilja |
| 4,765,603 A | 8/1988 | Huppert |
| 4,907,703 A | 3/1990 | Alger et al. |
| 4,907,789 A | 3/1990 | Tice |
| 5,101,988 A | 4/1992 | Meyer |
| 5,116,279 A | 5/1992 | Perry |
| D348,809 S | 7/1994 | Ladwig |
| 5,363,755 A * | 11/1994 | Liang .......................... 99/484 |
| 5,527,022 A | 6/1996 | Gibson |
| 5,626,067 A * | 5/1997 | Lothe .......................... 83/761 |
| 5,630,518 A | 5/1997 | Collins |
| 5,638,973 A | 6/1997 | Dewey et al. |
| 5,720,403 A | 2/1998 | Sawyer |
| 5,860,641 A | 1/1999 | Heath |
| 6,200,212 B1 | 3/2001 | Henry et al. |
| 6,386,531 B1 * | 5/2002 | Prosser ....................... 269/15 |
| 6,460,841 B1 | 10/2002 | Durr |
| 6,478,293 B1 | 11/2002 | Keener |
| 6,651,970 B1 * | 11/2003 | Scott ....................... 269/289 R |
| 6,715,748 B1 | 4/2004 | Thompson et al. |
| 7,036,809 B1 * | 5/2006 | Mitchell ................. 269/289 R |

* cited by examiner

*Primary Examiner*—Lee D. Wilson
(74) *Attorney, Agent, or Firm*—Patterson, Thuente, Skaar & Christensen, P.A.

(57) ABSTRACT

A first cutting board segment in combination with a first tray is secured to a second cutting board segment in combination with a second tray by the use of a connector. Two or more board and tray combinations may be secured together by moving the connector transversely towards the trays. The boards, trays and connectors may be provided as a kit and disposed in a carrying case.

15 Claims, 10 Drawing Sheets

MODULAR CUTTING BOARD SYSTEM

FIELD OF THE INVENTION

The field of the present invention relates generally to cutting boards and more specifically to modular cutting board systems.

BACKGROUND OF THE INVENTION

Cutting boards are commonly used to provide a suitable surface for food preparation. Cutting boards protect the underlying surface from being damaged while simultaneously protecting the knife or similar instrument from becoming dull too quickly. In addition, a cutting board can provide a portable surface that can be removed to a sink and cleaned separately and thoroughly, whereas other surfaces, such as a kitchen countertop, may not provide adequate protection and cannot be as quickly or easily cleaned.

A significant disadvantage to conventional cutting boards is that not all cutting jobs require the same size cutting board. In order to be of sufficient size for many cutting jobs, cutting boards can become too large for convenient cleaning, storage, and transportation. Additionally, it may be impractical to use such large boards for smaller and more delicate cutting jobs. As a result, a variety of boards in different sizes and proportions must often be kept on hand. However, the keeping of a number of different sized boards creates additional storage and transportation problems. Additionally, it is more costly for a manufacturer to produce boards of varying sizes.

One solution to this problem is to have a modular cutting board system comprising multiple connectable boards of the same size, so that cutting space can be varied according to the needs of a particular cutting job and storage inconvenience is minimized. U.S. Pat. No. 4,756,519 provides a cutting board arrangement using multiple boards. Each board has a recess in one side edge and a projection in the opposing side edge to permit frictional interlocking and removal of the boards from engagement with one another. However, frictional interlocking of this nature does not allow the board to stay connected if it needs to be moved in its expanded condition, especially if a food item with any substantial weight is being supported.

U.S. Pat. No. 6,460,841 provides another modular cutting board. Each board section has a keyed tongue disposed along a first edge and a keyhole groove disposed along a second edge such that when engaged, a single, rigid board is formed. The cutting board segments, however, can only be connected side to side, not also end to end, which limits the ability to adapt to different cutting needs. Another disadvantage of the above cutting board arrangements is that they are not easily transportable.

SUMMARY OF THE INVENTION

A first cutting board segment in combination with a first tray is secured to a second cutting board segment in combination with a second tray by the use of a connector. Two or more board and tray combinations may be secured together by moving the connector transversely towards the trays. The boards, trays and connectors may be provided as a kit and disposed in a carrying case.

DETAILED DESCRIPTION OF THE INVENTION

Figure 1:
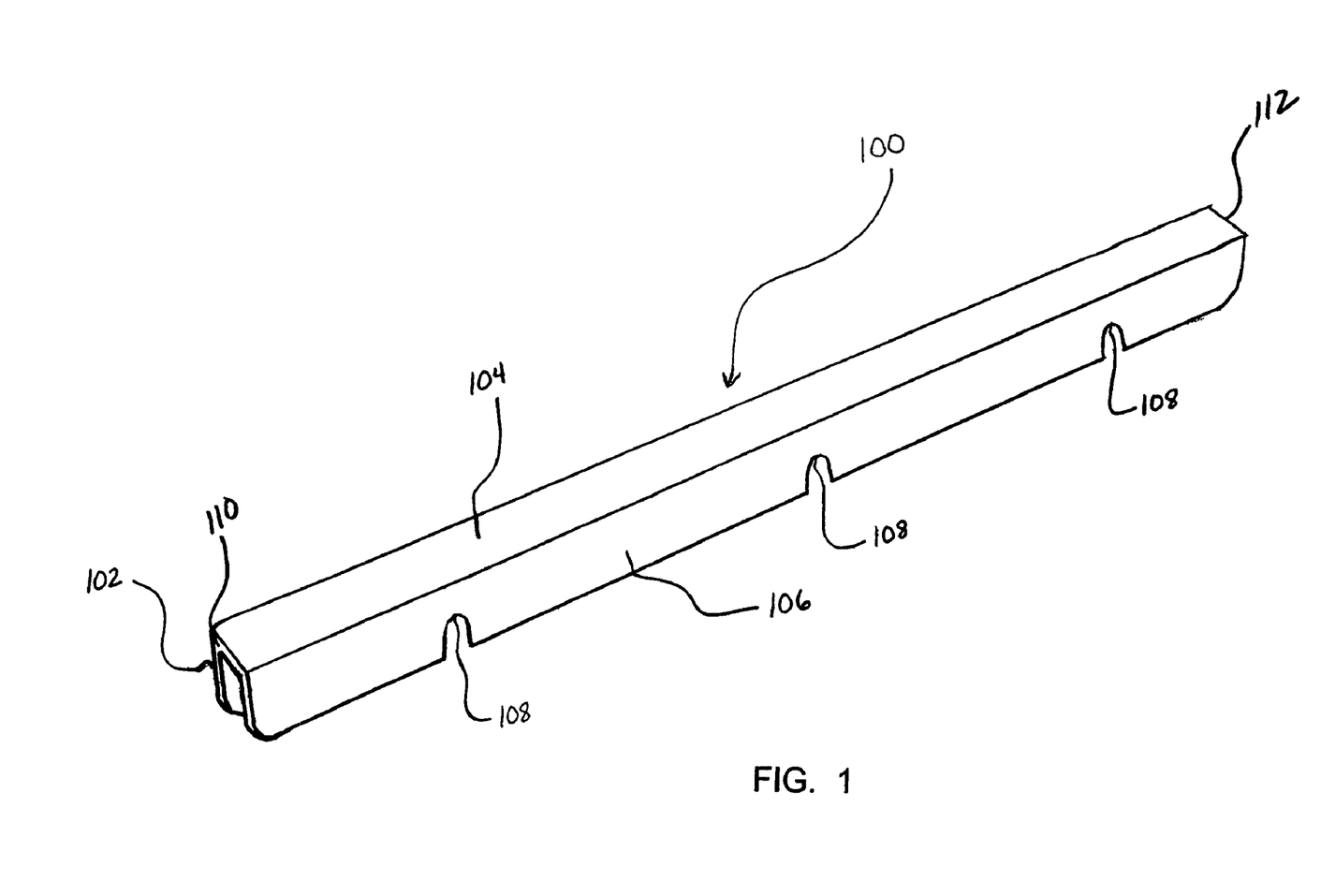
FIG. 1 is a perspective view of a modular cutting board connector according to an embodiment of the present invention.
Figure 2:
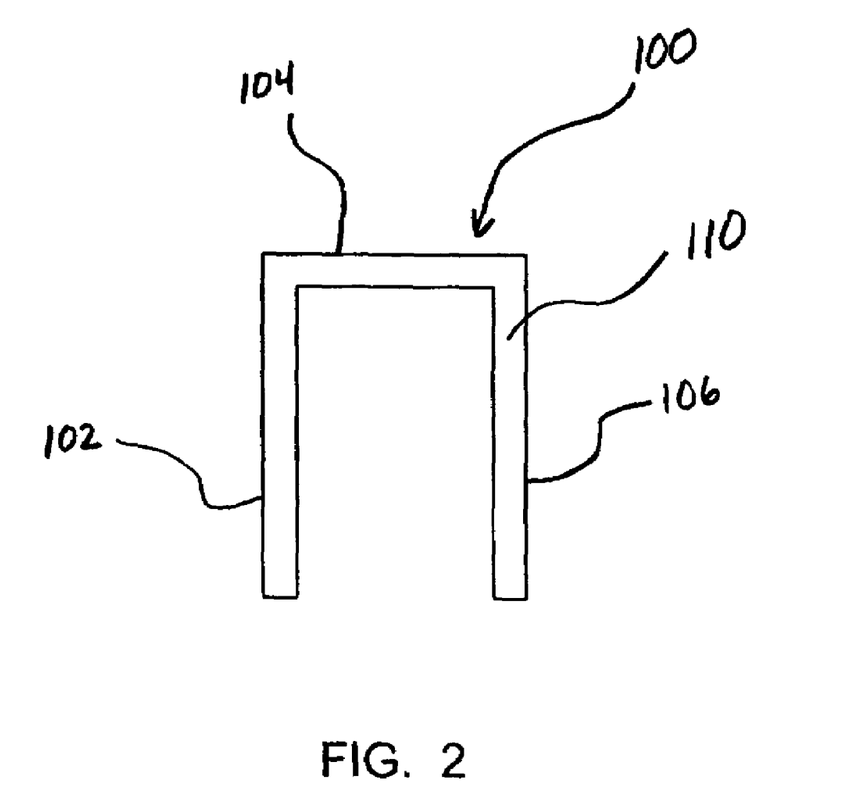
FIG. 2 is an end view of a modular cutting board connector according to an embodiment of the present invention.
Figure 3:
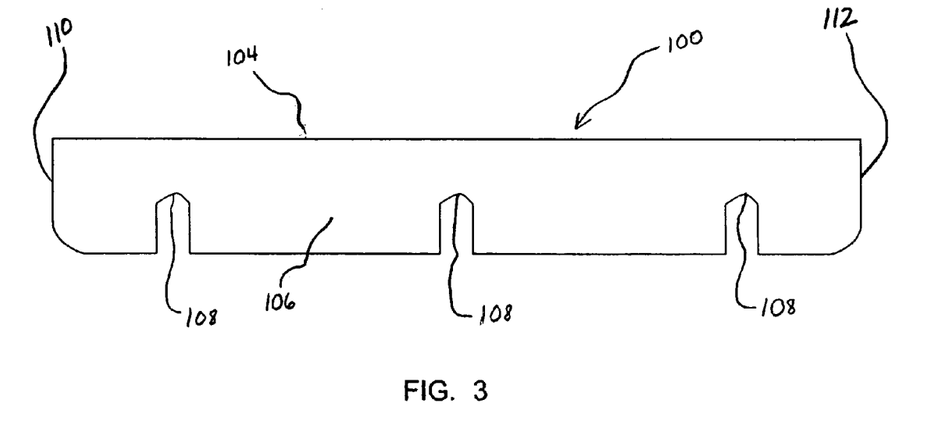
FIG. 3 is a side view of a modular cutting board connector according to an embodiment of the present invention.

Referring to FIGS. 1–3, a modular cutting board connector 100 according to an embodiment of the present invention is shown. Connector 100 comprises a first side portion 102, transverse portion 104, and second side portion 106 which define a generally squared off U-shaped first end 110 and second end 112. One of skill in the art will recognize that connector 100 can take various other shapes without departing from the scope of the present invention, such as V-shaped, polygonal, arcuate or a combination thereof. Connector 100 further includes a plurality of slots 108. The length of the connector 100 and the number of slots 108 will vary according to the size and character of the cutting board 200 with which it is to be used.

The connector 100 contemplated by the present invention can be made of any material rigid enough to adequately hold two cutting board segments 200 together. In one embodiment a connector 100 is injection molded out of plastic in order to provide continuity of materials with cutting board segments 200 and to prevent dulling of the knife or similar instrument. In another embodiment, a metal connector 100 is used. Persons having skill in the art will recognize that the connector 100 may be formed from any number of materials, including plastic, metal, fiberglass, wood or ceramic, without departing from the scope of the present invention.

A suitable cutting board segment for use with one embodiment of the present invention is disclosed in co-pending U.S. application Ser. No. 10/419,552, Pub. No. 2004/0207140, filed Apr. 21, 2003 and published Oct. 21, 2004. Said application is hereby incorporated in its entirety by reference.

Figure 4:
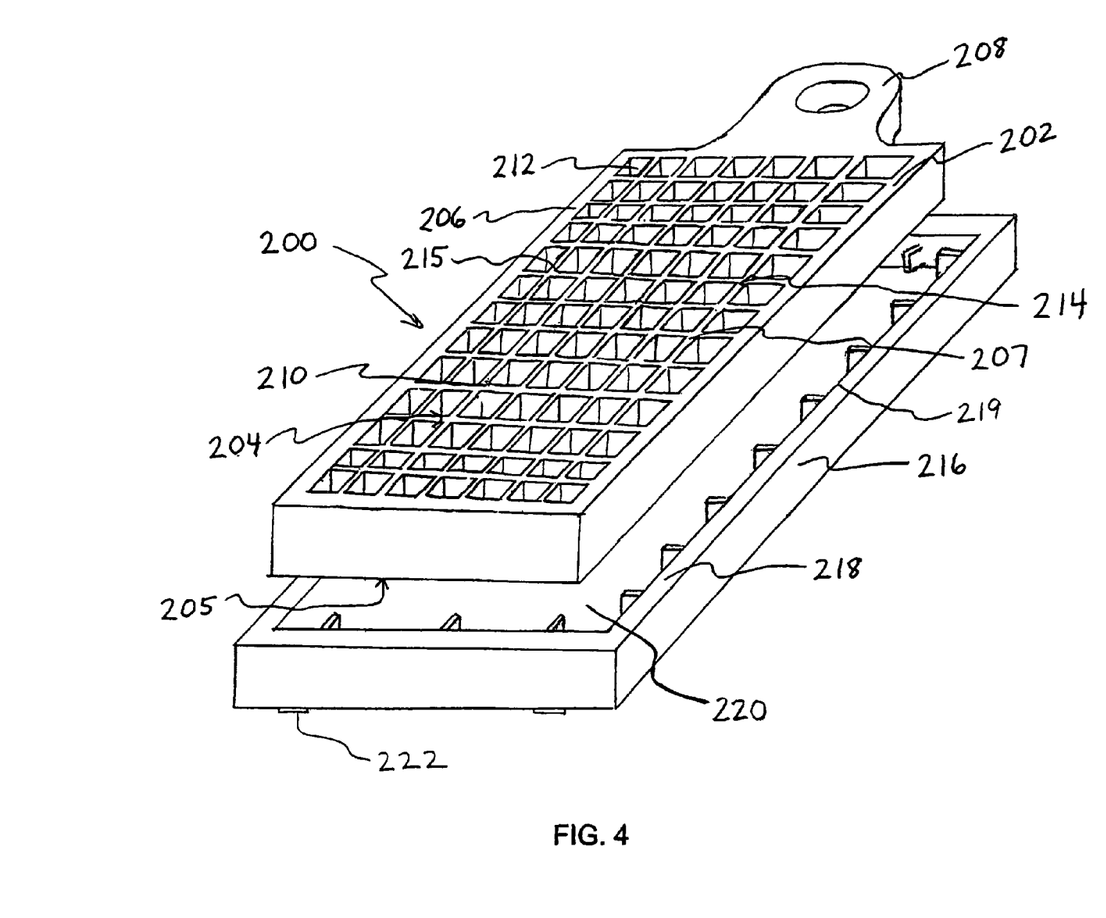
FIG. 4 is a perspective view of a modular cutting board segment according to an embodiment of the present invention.

A cutting board segment 200 is shown in FIG. 4. The cutting board segment 200 comprises a generally rectangular shaped body 202 with a top side 204, a bottom side 205 and a perimeter 206 there around. One or both of the top 204 and bottom 205 sides of the cutting board segment 200 comprise a cutting surface 207. A handle 208 may optionally be provided to the device 200 to aid in holding and storage.

The cutting surface 207 comprises a matrix or lattice portion 210 of openings or apertures 212 extending from the top surface 204 through the body 202. The lattice portion 210 comprises a plurality of widthwise 214 and lengthwise 215 members with the apertures 212 defined there between. The apertures 212 allow fluids to pass through the cutting surface 207 without accumulating thereon. The sizing and pattern of the lattice portion 210 is selected to support the food product on the lattice 214 while still permitting the fluid to drain.

FIG. 4 also shows a tray 216 that conforms to the shape of the cutting board segment 200. The tray 216 comprises a tray body 218 having a plurality of support tabs 219 and a recess 220 configured to receive the board 200. The support tabs 219 support the cutting board segment 200 when placed in the tray 216 and maintain the board segment 200 above the bottom of the tray. The recess 220 permits fluid and debris drained off the cutting surface 207 to be retained in the recess 220. Such retention of fluid and debris minimizes contamination of countertops, tables or other work surfaces. Waste fluid and debris may then be easily discarded. Tray 216 further includes a plurality of rubber feet 222 distributed along its bottom surface in order to prevent slippage with respect to an underlying surface while the cutting board segment 200 is in use.

Figure 5:
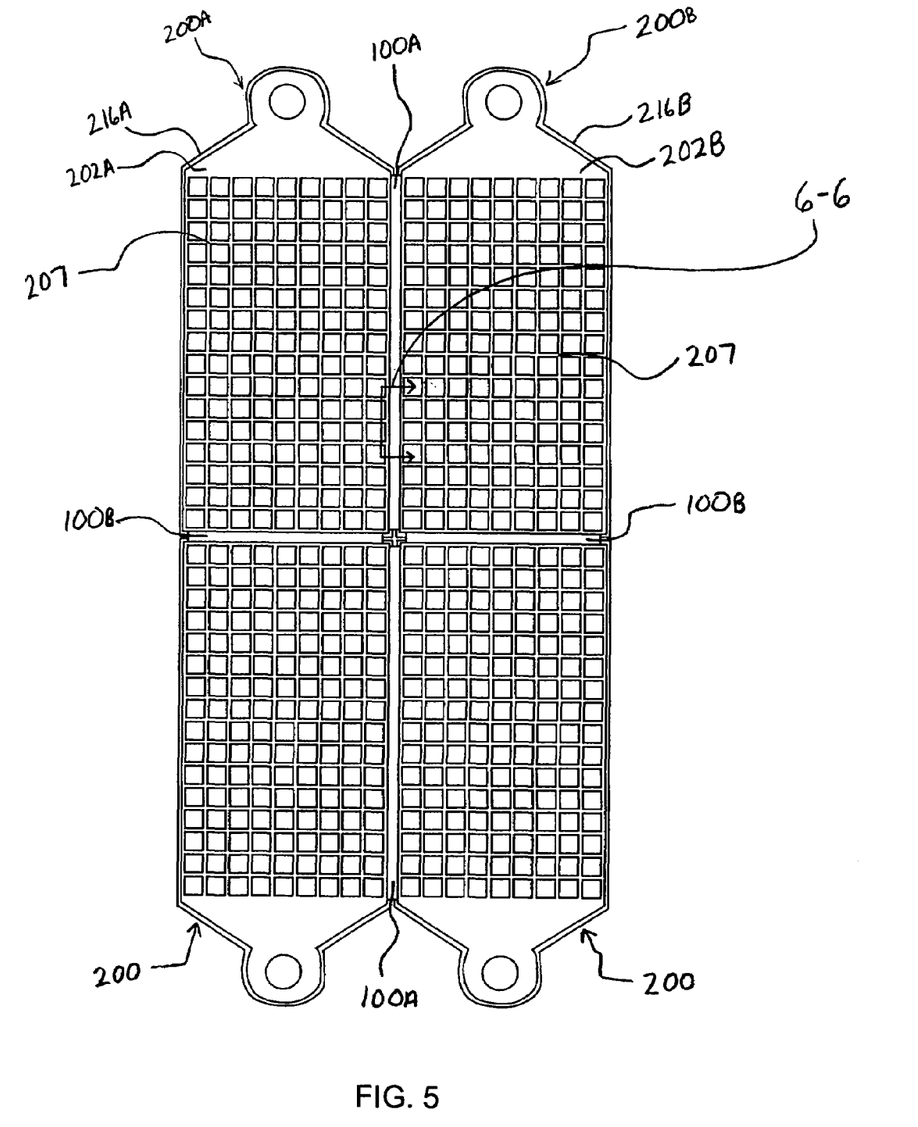
FIG. 5 is a top view of a plurality of modular cutting board segments linked together by a plurality of modular cutting board connectors according to an embodiment of the present invention.
Figure 6:
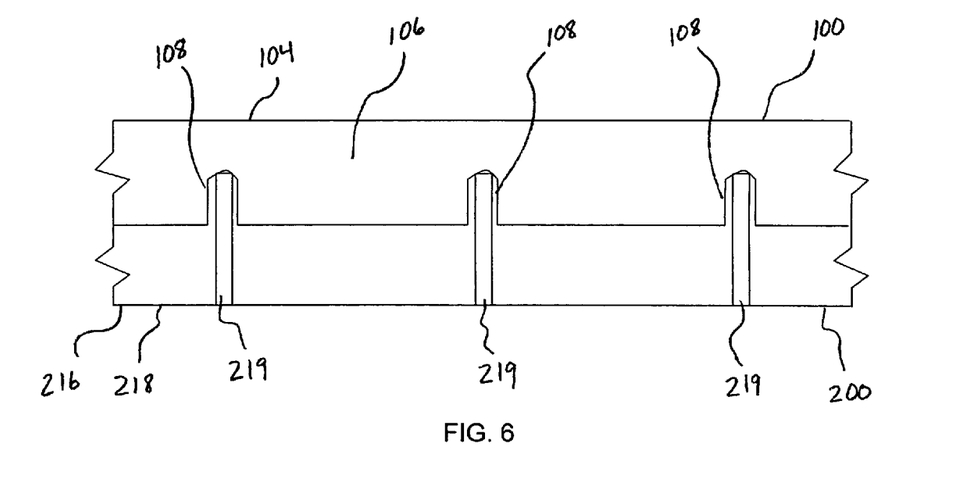
FIG. 6 is a sectional view of a modular cutting board connector engaging a modular cutting board segment according to the embodiment shown in FIG. 5 and taken along the line 6—6.

As can be seen in FIGS. 5 and 6, each modular cutting board connector 100 can connect two modular cutting board segments 200 with trays 116. First side portion 102 of connector 100A is inserted between the body 202A and tray 216A of a first modular cutting board segment 200A and second side portion 106 is inserted between the body 202B and tray 216B of a second modular cutting board segment 200B. Downward force is be applied to connector 100A until the bottom surface of top portion 104 is flush with the top edge of the tray 216 so that the connector 100A is securely held between the body 202A, 202B and tray 216A, 216B of each cutting board segment 200A, 200B. This allows connector 100A to sit slightly below cutting surface 207, so that neither the connector 100A nor the knife or similar instrument can be damaged. Slots 108 are aligned with the support tabs 219 in the tray 216, as shown in FIG. 6. Connectors 100 hold the cutting board segments 200 together snuggly, minimizing any gap between the board segments 200 that could allow fluids to leak onto the underlying support surface.

It should also be recognized that the spacing and size of the slots 108 of connectors 100 can alternatively be modified in shape and spacing to allow interlocking of board segments 200 without the presence of corresponding trays 216. In such configuration, slots 108 are aligned with either the widthwise 214 or lengthwise 215 members in the lattice portion 210 of the cutting board segments 200.

As shown in FIG. 5, connectors 100A, 100B can be used to connect cutting board segments 200 either side to side or end to end. One size connector 100A may be used for connecting board segments 200 connected side to side and another size connector 100B may be used for connecting board segments 200 connected end to end. Alternatively, the same size connector 100B could be used for connecting in both directions. Any number of connectors 100 can be used to connect a plurality of board segments 200 to increase work space. In this manner, modular cutting board segments 200 and modular cutting board connectors 100 can be used to meet cutting jobs of many sizes. Cleaning, transportation, and storage of cutting boards is made easy with the simple connectability and separability of cutting board segments 200 and connectors 100.

Figure 7:
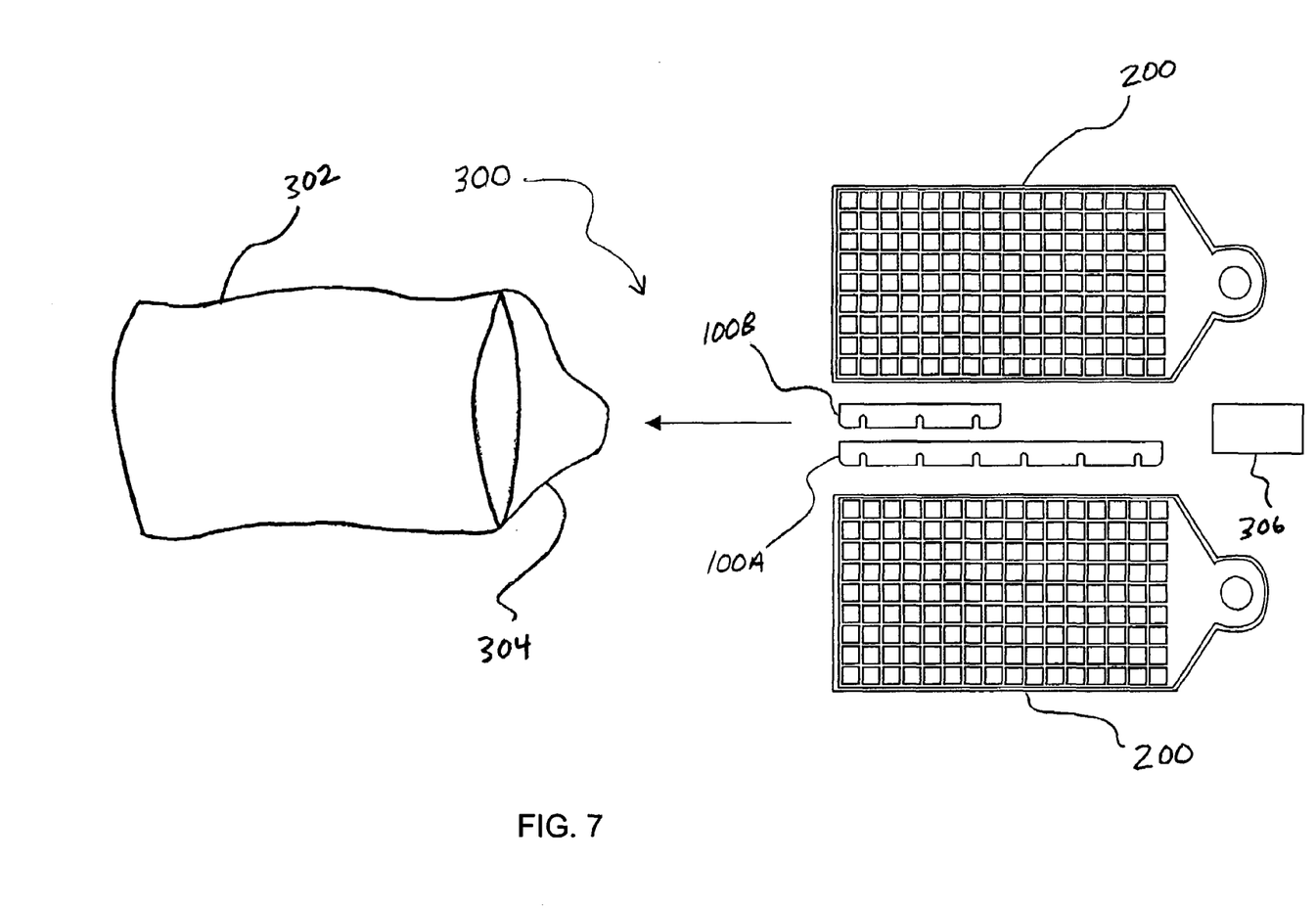
FIG. 7 is a view of a modular cutting board kit according to an embodiment of the present invention.

Referring to FIG. 7, a modular cutting board kit 300 according to an embodiment of the present invention is shown. Modular cutting board kit 300 includes two modular cutting board segments 200 with trays 216, a long connector piece 100A, a short connector piece 100B, a carrying case 302, and an instruction sheet 306. Cutting board segments 200 can be stacked on top of each other and disposed in the case 302 along with connector pieces 10A, 100B and a set of instructions 306. In this embodiment the opening to the carrying case 302 is closed with a drawstring 304, although any number of closing devices may be utilized.

In one embodiment, carrying case 302 comprises a urethane coated, water resistant nylon. Kit 300 further includes the instruction sheet 306 to explain to the user the operation of the kit 300. Kit may also include a knife, gloves, cutting surface accessories (described below), clamp, or other cutting related equipment. One of skill in the art will further recognize that a modular cutting board kit could also be configured to include additional cutting board segments 200 and connector pieces 100 by varying the size and shape of carrying case 302.

Figure 8:
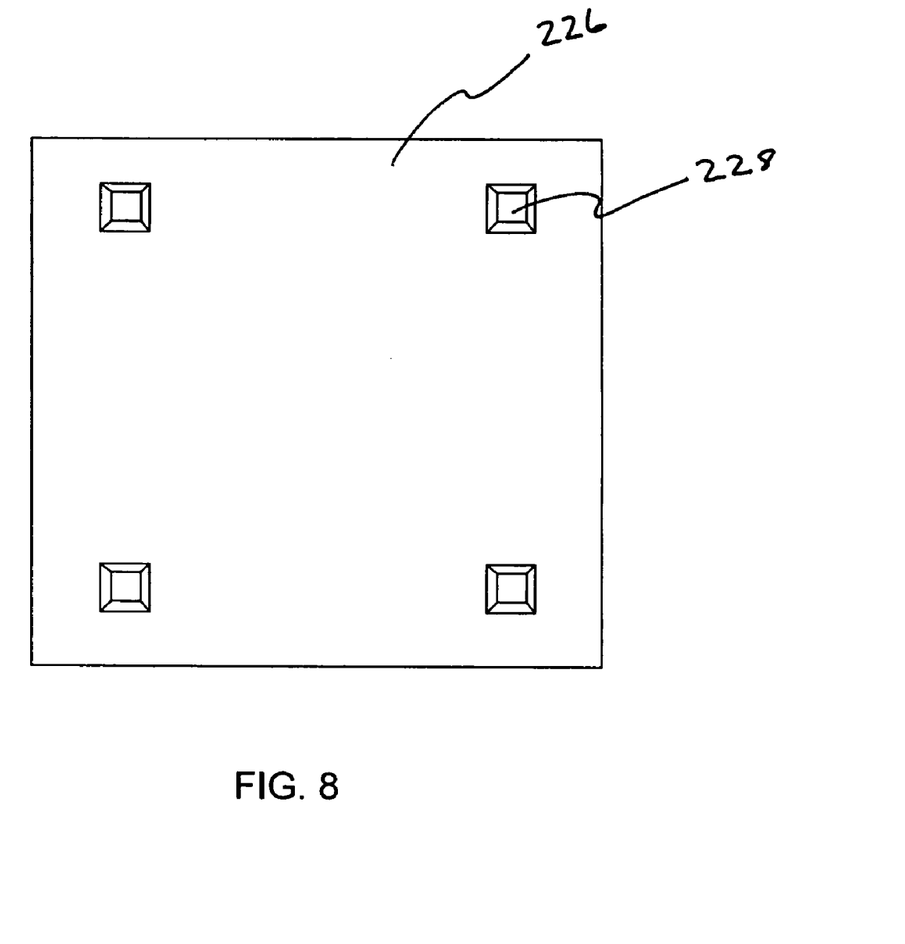
FIG. 8 is a bottom view of a solid cutting surface accessory that can be used in a modular cutting board system according to an embodiment of the present invention.
Figure 9:
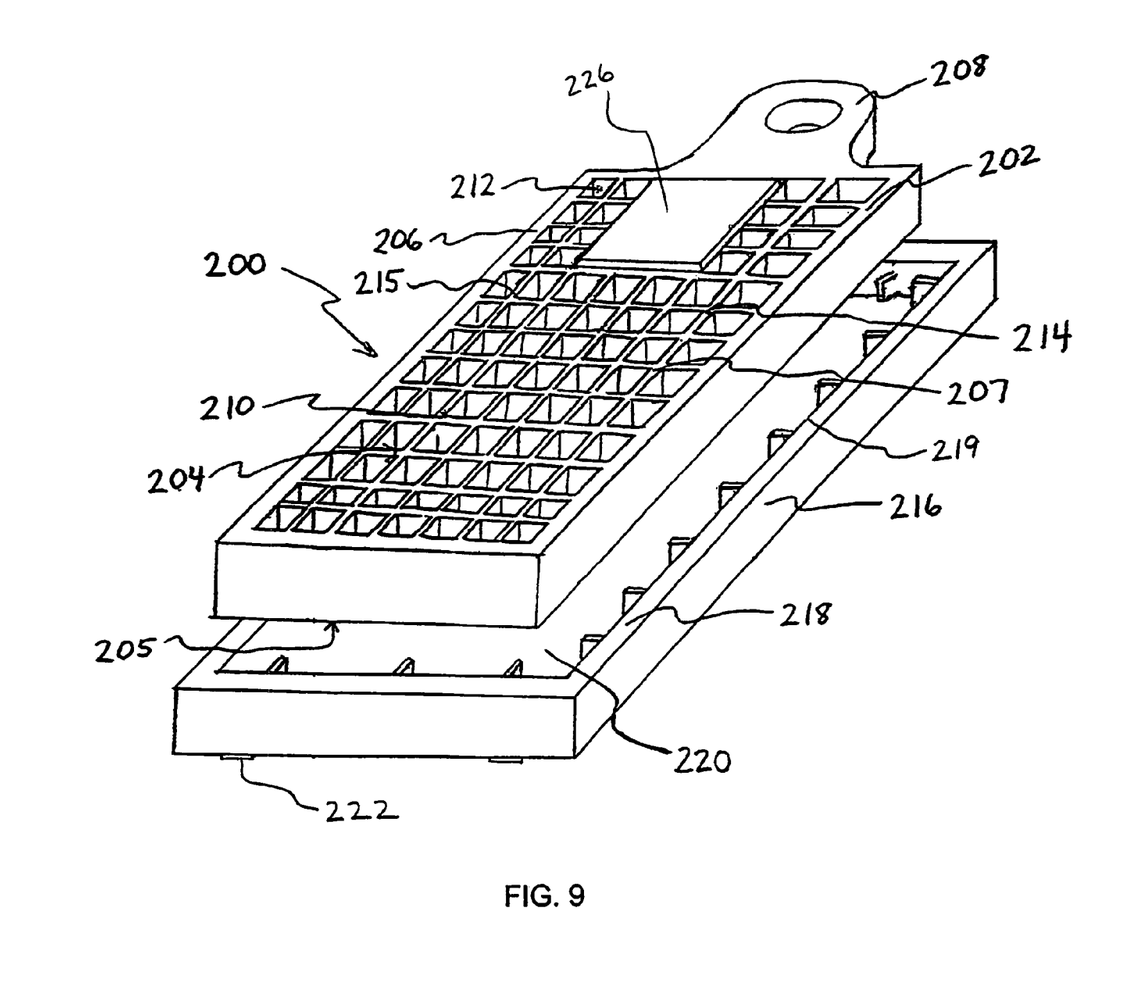
FIG. 9 is a perspective view of a modular cutting board segment with a solid cutting surface accessory according to an embodiment of the present invention.

Referring now to FIGS. 8 and 9, there can be seen a cutting surface accessory that can be used with an embodiment of the present invention. Accessories such as solid cutting surface accessory 226 can be used when a portion of the cutting work to be performed on a modular cutting board segment 200 is desired to be done on a solid board surface. Solid cutting surface accessory 226 is disposed on modular cutting board segment 200 by inserting feet 228 into apertures 212. Optimally, the feet are sized and spaced to interlock with apertures 212 of the board 200 so that accessory 226 does not easily move. The feet may be made of a wide range of materials, but are most optimally rubber. The feet may also be formed with accessory as part of a plastic molding operation.

Figure 10:
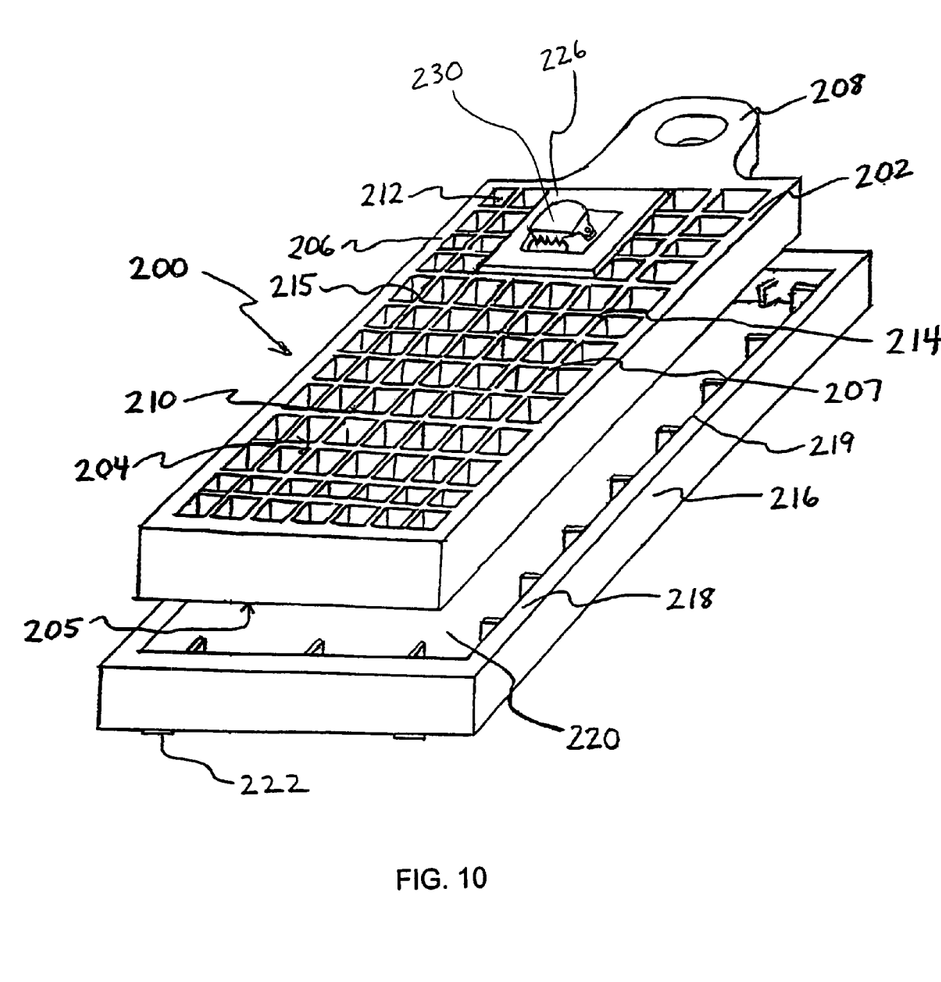
FIG. 10 is a perspective view of a modular cutting board segment with a clamp accessory according to an embodiment of the present invention.

As can be seen in FIG. 10, solid cutting surface accessory 226 may further be provided with a clamp 230 or other gripping feature mounted thereon in order to provide a user with additional measures for securing the workpiece beyond that provided by the board 200 itself. One of skill in the art will recognize that any number of tools that will aid in the cutting or preparation of food can be mounted on solid cutting surface accessory 226. In one embodiment, solid cutting surface insert 226 is a thin, generally rectangular piece and is comprised of the same material as the modular cutting board segment 200 with which it is used.

The embodiments described herein are intended to be illustrative and not limiting. Additional embodiments are within the claims. Although the present invention has been described with reference to particular embodiments, one skilled in the art will recognize that changes may be made in form and detail without departing from the spirit and scope of the invention.

What is claimed is:

1. A modular cutting board system comprising:
   a first cutting board segment in combination with a first tray;
   a second cutting board segment in combination with a second tray; and a connector interlocking the first cutting board segment and tray combination with the second cutting board segment and tray combination.

2. The modular cutting board system of claim 1, wherein the connector comprises:

a first side portion and a second side portion, the first and second side portions connected by a transverse portion.

3. The modular cutting board system of claim 2, wherein the first side portion and the second side portion of the connector each define a plurality of slots therein.

4. The modular cutting board system of claim 1, wherein the cutting board segments are generally rectangular shaped.

5. The modular cutting board system of claim 1, wherein each tray includes a plurality of support tabs for supporting each cutting board segment.

6. The modular cutting board system of claim 1, further comprising a cutting surface accessory disposed on one of the first cutting board segment or the second cutting board segment.

7. The modular cutting board system of claim 1, further comprising a plurality of feet disposed on each tray.

8. A method for assembling a modular cutting board, the method comprising the steps of:

Placing a first board segment and tray combination adjacent to a second board segment and tray combination;

placing a first connector in contact with each of the first board segment and tray combination and the second board segment and tray combination; and securing the first board segment and tray combination to the second board segment and tray combination by moving the first connector generally transversely toward the first and the second boards.

9. The method of claim 8, further comprising the steps of aligning the connector with a support tab in each of the first and second trays.

10. The method of claim 8, further comprising the steps of placing a third board segment and tray combination adjacent to the first board segment and tray combination;

placing a second connector in contact with each of the third board segment and tray combination and the first board segment and tray combination; and securing the third board segment and tray combination to the first board segment and tray combination by moving the second connector generally transversely toward the third and the first boards.

11. A modular cutting board kit, the kit comprising:

a carrying case;

a first cutting board segment disposed in the carrying case;

a first tray disposed in the case;

a second cutting board segment disposed in the carrying case;

a second tray disposed in the case;

a connector disposed in the carrying case; and an instruction sheet disposed in the carrying case.

12. The modular cutting board kit of claim 11, wherein the carrying case includes a closing device.

13. The modular cutting board kit of claim 12, wherein the closing device is a drawstring.

14. The modular cutting board kit of claim 11, further comprising a cutting surface accessory disposed in the carrying case.

15. The modular cutting board kit of claim 14, wherein the cutting surface accessory is a clamp.

\* \* \* \* \*